(12) United States Patent
Takemura et al.

(10) Patent No.: US 7,418,473 B2
(45) Date of Patent: Aug. 26, 2008

(54) SERVER CLIENT SYSTEM FOR AUTOMATICALLY SETTING PORT NUMBER

(75) Inventors: Susumu Takemura, Neyagawa (JP); Yasushi Ikeda, Neyagawa (JP); Koichi Kato, Kusatsu (JP)

(73) Assignee: Onkyo Corporation, Osaka (JP)

( * ) Notice: Subject to any disclaimer, the term of this patent is extended or adjusted under 35 U.S.C. 154(b) by 929 days.

(21) Appl. No.: 10/682,074

(22) Filed: Oct. 10, 2003

(65) Prior Publication Data

US 2004/0131077 A1 Jul. 8, 2004

(30) Foreign Application Priority Data

Oct. 11, 2002 (JP) ............... 2002-298300
Jun. 17, 2003 (JP) ............... 2003-172410

(51) Int. Cl.
*G06F 15/16* (2006.01)
(52) U.S. Cl. ............ 709/203; 709/226; 709/228; 370/230
(58) Field of Classification Search ........... 709/203, 709/226, 236, 228; 370/230, 251–252, 351, 370/420
See application file for complete search history.

(56) References Cited

U.S. PATENT DOCUMENTS

| | | | |
|---|---|---|---|
| 6,314,088 B1 | 11/2001 | Yamano | |
| 6,449,251 B1 * | 9/2002 | Awadallah et al. | 370/229 |
| 7,009,956 B2 * | 3/2006 | Heinonen et al. | 370/338 |
| 2003/0055947 A1 * | 3/2003 | Haneda | 709/224 |

FOREIGN PATENT DOCUMENTS

| | | |
|---|---|---|
| JP | 03-000589 | 1/1991 |
| JP | 10-184402 | 7/1998 |
| JP | 2001-308934 | 11/2001 |

OTHER PUBLICATIONS

Communication pursuant to Article 96(2) EPC dated Nov. 17, 2005 issued in corresponding European Application No. 03 022 805.0-2413.
Manabu Yamaguchi, "Back Office Extensive Collection of Techniques How to Connect OWA and Exchange Server Through Firewall", Feb. 1, 2001, pp. 72-73, vol. 31.
E. Guttman et al., "Service Location Protocol, Version 2", Vinca Corporation, Jun. 1999, Geneve.
Rakesh Agrawl et al., "Vinci: A Service-Oriented Architecture for Rapid Development of Web Applications", IBM Almaden Research Center, 650 Harry Road, San Jose, CA 95120.
"UPnP, Jini and Salutation—A look at some popular coordination frameworks for future networked devices", Jun. 17, 1999.

(Continued)

*Primary Examiner*—Frantz B Jean
(74) *Attorney, Agent, or Firm*—Renner, Otto, Boisselle & Sklar, LLP

(57) ABSTRACT

All port numbers are set at a server, whereas only one port number is set at a client. The client searches for the server by using the set port number. The server responds to searching by the client and notifies the client of the other port number that is not set at the client. The client establishes the communication with the server by using the notified port number. This makes it unnecessary to set all port numbers at the client. It is therefore possible to provide a server client system with time for setting a port number decreased.

12 Claims, 13 Drawing Sheets

OTHER PUBLICATIONS

Sasikanth Avancha, "Enhancing the Bluetooth Service Discovery Protocol", Department of Computer Science and Electrical Engineering, University of Maryland Baltimore County, Baltimore, MD 21250.

Bellovin S.: "RFC 1579, Firewall-Friendly FTP" IETF—Internet Engineering Task Force Request for Comment, Feb. 1994; pp. 1-4.

European Search Report.

* cited by examiner

SERVER CLIENT SYSTEM FOR AUTOMATICALLY SETTING PORT NUMBER

BACKGROUND OF THE INVENTION

1. Field of the Invention

The present invention relates to a server client system and, more specifically, to an improvement of a port setting in a network audio system operating in a server client environment.

2. Description of the Related Art

At the present day, a network audio system operating in a server client environment has been provided. The network audio system is provided with a content server for storing musical contents and audio clients for reproducing the music. The content server and the audio clients communicate with each other in accordance with a specific communication protocol.

For example, in the case of adopting TCP/IP (Transmission Control Protocol/Internet Protocol) as a communication protocol, each of the content server and the audio clients is provided with a unique IP address in a network. The content server and the audio clients identify each other due to the IP address. In addition, the content server and the audio clients have a plurality of ports for transmitting and receiving the data. The TCP/IP allocates port numbers of 0 to 65535 to these ports.

When the audio client requests something to the content server, the audio client specifies the IP address and the port number of the content server to transmit the data to the specified content server through the specified port. On the contrary, when the content server responds to the request of the audio client, the content server specifies the IP address and the port number of the audio client to transmit the data to the specified audio client through the specified port.

In order to allow the above-described data transmission and reception, normally, one port is enough between the content server and the audio clients; however, depending on an application program, sometimes a plurality of ports must be saved. In this case, a user needs to set a plurality of port numbers not only for the content server but also for each audio client. However, it is a very troublesome task to set a plurality of port numbers for each of many audio clients existing on a network and this may result in a high probability of setting a false port number.

In addition, for the reason such as version upgrade of the application program or the like, the port numbers to be used sometimes must be altered. Also in this case, as the above, it is very troublesome to alter the port numbers set in each audio client.

In addition, when the other application program other than an original application program is installed in the content server, the other application program sometime uses a port number to be used by the original application program. Also in this case, it is very troublesome to alter the port numbers set in each audio client.

SUMMARY OF THE INVENTION

An object of the present invention is to provide a server client system capable of decreasing trouble of setting a port number.

A server client system according to an aspect of the present invention comprises a server and a client connected to the server. The server includes a port number transmitter transmitting, on a first pot number, a second port number to the client. The client includes a communicator communicating with the server on the second port number transmitted from the server.

According to the server client system, since the second port number is notified from the server to the client by using the first port number, the second port number does not need to be set in the client. As a result, a trouble of setting a port number or the like can be decreased.

Preferably, the port number transmitter transmits identification information having a first value or a second value to the client. The communicator communicates with the server on the second port number when the identification information transmitted from the server has the first value, and the communicator communicates with the server on a third port number when the identification information has the second value.

In this case, when the identification information has the first value, the client uses the second port number is notified from the server thereto. However, when the identification information has the second value, the client uses the third port number that is predetermined. Accordingly, in the case of a server of an old version having no function according to the present invention, the client is capable of using the third port number the same as before. Therefore the present system has an upward compatibility.

A server client system according to another aspect of the present invention comprises a server and a client connected to the server. The server includes a waiter waiting for the communication from the client on the port number being used at the present and the port number used in the past. The client includes a communicator communicating with the server on the port number stored in port number storage. The server further includes a transmitter transmitting the port number being used at the present to the client when receiving the communication from the client. The client further includes a rewriter rewriting the port number stored in the port number storage into the port number transmitted from the server.

According to the server client system, since the server waits for the communication from the client by using not only the port number that is being used at the present but also the port number that was used in the past, even the client, which only knows the old port number used in the past but does not know the changed port number, can communicate with the server. Furthermore, since a new port number being used at the present is notified from the server to the client and the port number stored in the client is rewritten, next time, the client can communicate with the server by using the new port number. As a result, also in this case, a trouble of setting a port number or the like can be decreased.

A server client system according to still another aspect of the present invention comprises a server and a client connected to the server. The server includes a waiter selecting a port number available among a plurality of port numbers and waiting for the communication from the client on the selected port number. The client includes a communicator selecting a port number to be used among the plurality of port numbers and communicating with the server on the selected port number. The server further includes a responder responding to the client when receiving the communication from the client. The client further includes a changer changing the port number to be used when receiving no response from the server.

According to this server client system, since the server waits for the communication from the client by using the port number that is capable of being used from among the plurality of port numbers, while the client communicates with the server by using the plurality of port numbers by rotation, even when the other application programs have already used some of the plurality of port numbers, the client can certainly communicate with the server. As a result, also in this case, a trouble of setting a port number or the like can be decreased.

A server client system according to yet another aspect of the present invention comprises a server in which a server application program for providing a predetermined service is installed and a client connected to the server and in which a client application program for providing the service is installed. The server client system further comprises a guidance master application program and a guidance server application program for managing the setting information regarding the service and an update date and time of the setting information. The guidance master application program includes the step of inquiring the setting information and the update date and time of the guidance server application program. The client application program includes the step of inquiring the setting information and the update date and time of the guidance server application program. The guidance server application program includes the step of informing the setting information and the update date and time in response to the inquiry. The guidance master application program further includes the step of comparing the informed update date and time with the update date and time managed by the guidance master application program, and updating the setting information managed by the guidance server application program with the setting information managed by the guidance master application program when the informed update date and time are older than the update date and time managed by the guidance master application program. The client application program further includes the step of comparing the informed update date and time with the update date and time managed by the client application program, and updating the setting information managed by the client application program with the informed setting information when the informed update date and time are newer than the update date and time managed by the client application program.

According to the server client system, the guidance master application program inquires the setting information and the update date and time of the guidance server application program. If the update date and time of the guidance server application program is older than the update date and time of the guidance master application program, the setting information of the guidance server application program is rewritten by the setting information of the guidance master application program. In addition, the client application program inquires the setting information and its update date and time of the guidance server application program. If the update date and time of the guidance server application program is newer than the update date and time of the client application program, the setting information of the client application program is rewritten by the setting information of the guidance server application program. Accordingly, the newest setting information in the guidance master application program is uploaded in the guidance server application program to be downloaded in the client application program. As a result, a trouble of setting a port number or the like can be decreased.

Preferably, the setting information includes a port number. The guidance server application program is installed in the client.

When the client is a machine only for reproducing the contents, even using a predetermined port number, competition of the port number will not occur in the guidance server application program.

More preferably, the server client system includes a plurality of the clients.

In this case, when at least one client is running, the guidance master application program may upload the port number in the guidance server application program, so that the client application program is capable of downloading the port number.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
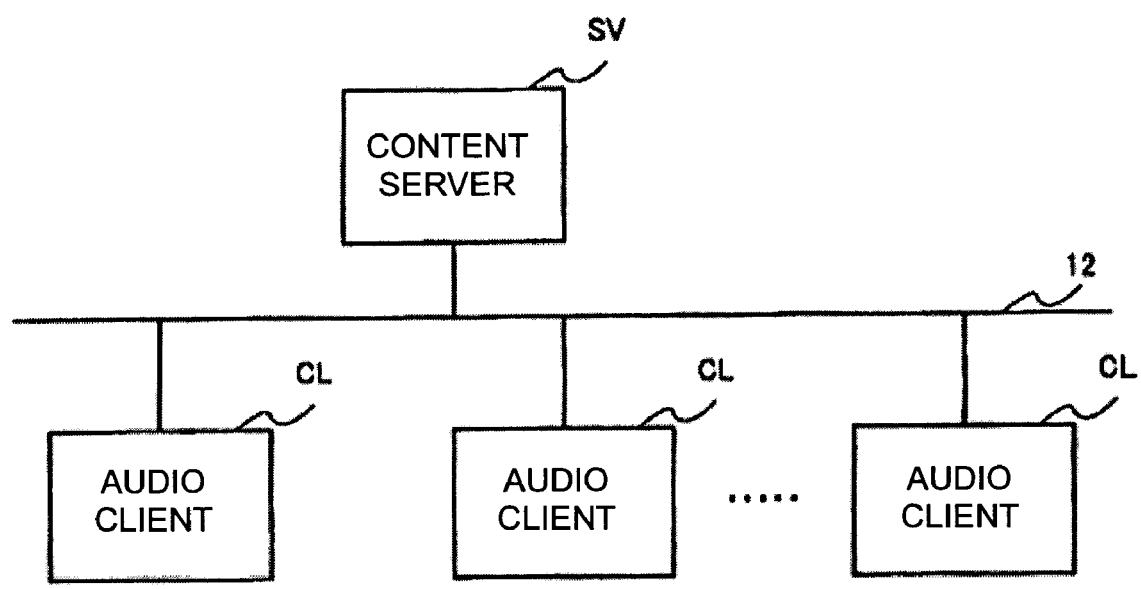
FIG. 1 is a functional block diagram showing an entire structure of a network audio system according to an embodiment of the present invention.

With reference to the drawings, embodiments according to the present invention will be described in detail below. It is noted that the same reference numerals are applied to the same or similar parts and elements throughout the drawings, and the description of the same or similar parts and elements will not be repeated.

First Embodiment

With reference to FIG. 1, a network audio system 10 according to a first embodiment of the present invention includes a content server SV and a plurality of audio clients CL. The content server SV and the audio client CL are connected with each other by a LAN (Local Area Network) 12. The content server SV stores a great number of musical contents and distributes them to each of the audio clients CL.

Each audio client CL reproduces the music on the basis of the musical content being distributed from the content server SV.

According to the example shown in FIG. 1, a plurality of audio clients CL exist; however, at least one audio client CL may be enough. Although only one content server SV exists in FIG. 1, a plurality of content servers SV may exist. In addition, the LAN 12 is employed as a computer network; however, the computer network is not limited thereto and, for example, USB and IEEE 1394 or the like may be employed. In the case of employing LAN, it is preferable to employ TCP/IP that is standard in a PC (Personal Computer) as a communication protocol; however, the communication protocol is not limited thereto and, for example, UDP (User Datagram Protocol) or the like may be employed. In addition, in FIG. 1, the content server SV and the audio clients CL are connected with each other so as to branch from a backbone wire of the LAN 12; however, for example, in the case of 10BASE-T and 100BASE-TX, they may be connected in a star around a hub.

Figure 2:
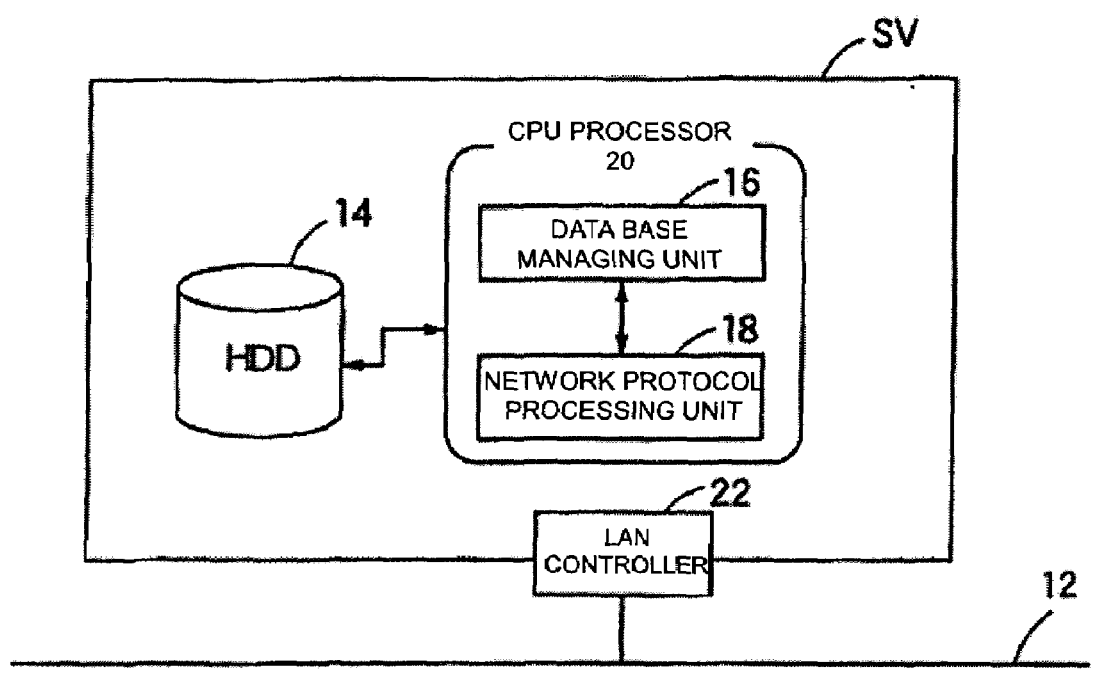
FIG. 2 is a functional block diagram showing a structure of a content server shown in FIG. 1.

With reference to FIG. 2, the content server SV includes an HDD (Hard Disk Drive) 14 for storing compression digital musical data, a CPU processor 20 including a data base managing unit 16 and a network protocol processing unit 18, and a LAN controller 22 for transmitting and receiving the data between the content server SV and the LAN 12.

Figure 3:
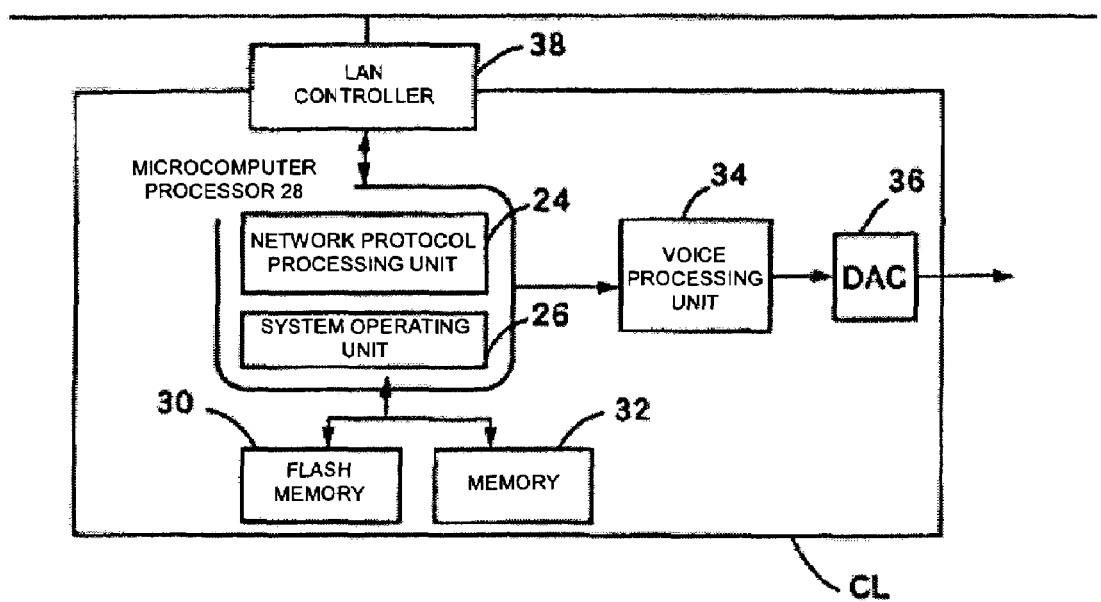
FIG. 3 is a functional block diagram showing a structure of the audio client shown in FIG. 1.

With reference to FIG. 3, each audio client CL includes a microcomputer processor unit 28 including a network protocol processing unit 24 and a system operating unit 26, a flush memory 30 being a typical example of a nonvolatile semiconductor memory device, a memory 32 for temporarily storing the compression digital musical data or the like that are sequentially inputted and sequentially outputting them, a voice processing unit 34 for decoding the compression digital musical data and generating non-compression digital musical data, a D/A converter (DAC) 36 for converting the digital musical data into the analog musical data, and a LAN controller 38 for transmitting and receiving the data between this audio client CL and the LAN 12.

Next, the operation of the network audio system 10 that is constructed as described above will be described below.

In order to allow a sequence of operation such that the audio client CL requests a desired musical content for the content server SV, the content server SV distributes the requested musical content to the audio client CL, and the audio client CL reproduces the music on the basis of the distributed musical content, at first, the connection between the content server SV and each audio client CL must be established. According to the present embodiment, two connections may be established on a command port and a push port. The command port is a port allowing the audio client CL to transmit the request to the content server SV and allowing the content server SV to return the response to the request to the audio client CL. The push port is a port for allowing the content server SV to transmit a spontaneous request to the audio client CL.

Figure 4:
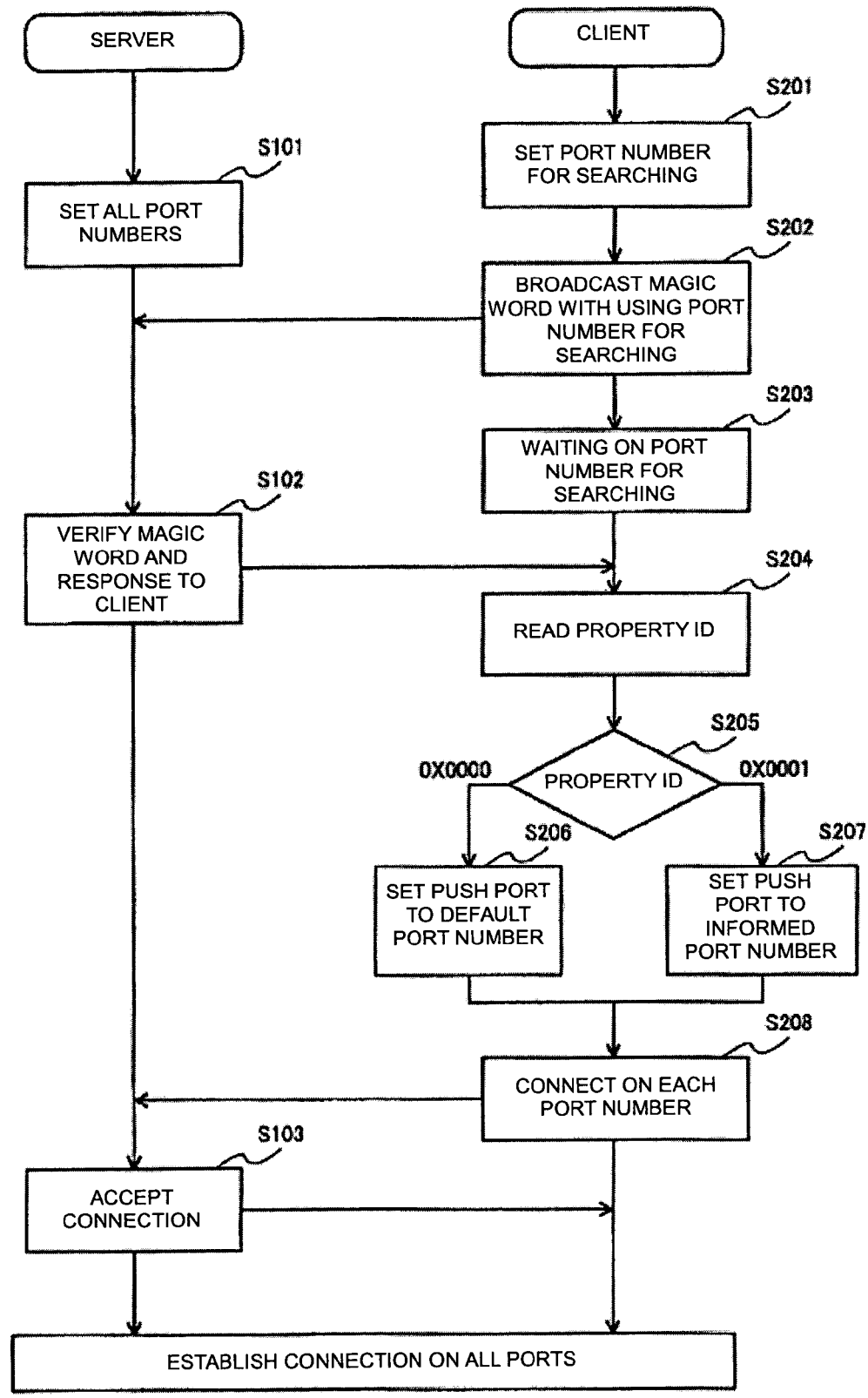
FIG. 4 is a flowchart showing the operation of a network audio system according to a first embodiment of the present invention.

The audio client CL searches for the content server SV connected to the LAN 12 before establishing the connection to the content server SV. This operation from the searching to the connection will be described with reference to the flow-chart shown in FIG. 4 below.

In the content server SV, the user sets all of plural port numbers to be used (S101). The port number and the number of them to be set are not limited; however, according to the present embodiment, it is assumed that, as a port number for the command port, "60000" is set, and as a port number for the push port, "40000" is set, respectively. In the case that the user does not set the port number for the push port, it is assumed that "60001" is set as a port number for the push port in the default mode.

On the other hand, at each audio client CL, the user sets only one port number from among a plurality of port numbers set in the server SV for searching (S201). According to the present embodiment, the port number "60000" for the command port is only set for searching and the port number for the push port is not set.

When the above-described initial setting is finished, the audio client CL creates a searching packet including a magic word and broadcasts the searching packet on the LAN 12 by using the above-described port number set for searching (S202). According to the present embodiment, for example, in accordance with UDP, the port number "60000" for the command port is used for searching to broadcast the magic word. The magic word is the arbitrary information to be set in a specific server and client in advance, respectively, in order to allow the communication between the specific server and client. After broadcasting the magic word on the port number for searching in this way, the audio client CL will wait for a response from the content server SV on the same port number for searching (S203).

On the other hand, since the content server SV is waiting for the searching from each audio client CL on the port number for searching, the content server SV receives the broadcasted searching packet on this port number for searching. Then, the content server SV verifies the magic word included in the received searching packet and responds to the audio client CL that broadcasted the searching packet(S102). More specifically, the content server SV compares the received magic word with the magic word that has been set in advance and, then, when they correspond with each other, the content server SV responds to the audio client CL, and when they do not correspond with each other, the content server SV does not respond to the audio client CL. In the case of responding, the content server SV returns a predetermined searching response packet to the audio client CL, for example, in accordance with the UDP.

The content server SV conventionally transmits the searching response packet of an old format shown in a table 1; however, according to the present embodiment, the content server SV transmits the searching response packet of a new format shown in a table 2.

TABLE 1

| Old Format | |
|---|---|
| 4 bytes | Magic word |
| 64 bytes | Server name |
| 4 bytes | Maximum client number |
| 4 bytes | Vendor ID |
| 52 bytes | Reserve |

TABLE 2

| New Format | |
|---|---|
| 4 bytes | Magic word |
| 64 bytes | Server name |
| 4 bytes | Maximum client number |
| 4 bytes | Vendor ID |
| 2 bytes | Property ID |
| 2 bytes | Port number |
| 48 bytes | Reserve |

The searching response packet shown in Table 1 includes a magic word, a server name, the maximum client number, a vendor ID and a reserve. This magic word is same as the magic word that has been transmitted from the audio client CL. The server name is a name that is arbitrarily provided to the content server SV. The maximum client number is the number of the audio clients capable of being connected to the content server SV. The vendor ID is the identification information for specifying the vendor of the content server SV. The reserve is an area in reserve that is secured for a future extension.

On the contrary, the searching response packet of the new format shown in Table 2 further includes an property ID and a port number. The property ID and the port number will be set by using the reserve in the old format.

The property ID is identification information for specifying if a predetermined default port number is used or a port number recorded in the next area is used. The property ID is not limited particularly; however, according to the present embodiment, it is assumed that the property ID takes two values: "0x0000" and "1x0001". The other values are reserved for the future extension. The port number can be arbitrarily set by the user in the above-described step S101. In the case of using a default port number for the push port (in the present embodiment, "60001"), the user does not particularly set the port number. On the other hand, in the case of using a specific port number for the push port (in the present embodiment, "40000"), the user sets the port number.

Receiving the above-described searching response packet, the audio client CL reads the property ID from this searching response packet (S204) to determined whether this property ID is "0x0000" or "0x0001" (S205). In the case that the property ID is "0x0000", the audio client CL sets the push port to the default port number "60001" (S206). On the other hand, in the case that the property ID is "0x0000", the audio client CL sets the push port to the port number "40000" that has been recorded in the next area (S207).

Subsequently, by using the port number "60000" for the command port that has been set in advance in step S201, for example, in accordance with TCP, the audio client CL requests the connection to the content server SV (S208). The content server SV receives this connection request and, then, the content server SV responds to the audio client CL (S103). Hereby, on the command port (the port number "60000"), the connection is established.

In addition, by using the port number "60001" or "40000" for the push port that has been set in step S206 or S207, the audio client CL requests the connection to the content server SV (S208). When the content server SV receives this connection request, the content server SV responds to the audio client CL (S103). Hereby, on the push port (on the port number "60001" or "40000"), the connection is established. More specifically, in the case that the property ID is "0x0000", the connection is established on the default port number "60001". On the other hand, in the case that the property ID is "0x0001", the connection is established on the port number "40000" that is notified from the content server SV.

A server application program for allowing the content server SV to carry out steps S101 to S103 described above is installed in the content server SV. In addition, a client application program for allowing the audio client CL to carry out steps S201 to S208 described above is installed in the audio client CL.

As described above, according to the first embodiment, the content server SV notifies the port number for the push port to the audio client CL and the audio client CL requests the connection for the content server SV by using the notified port number, so that when the user only sets the port number for the command port to the audio client CL without setting the port number for the push port, the content server SV and the audio client CL can establish the connection on the push port. Accordingly, it is possible to decrease the trouble to set the port number for the push port to each audio client CL. In addition, even if the other application program installed in the content server SV has already used the default port number "60001" for the push port, only by setting the other port number "40000" at the content server SV side, it is possible to establish the connection on the push port.

In addition, when the content server SV transmits the property ID to the audio client CL and the property ID is "0x0000", the audio client CL sets the push port to the default port number "60001". Accordingly, assumed that only the application program of the old version is installed in the content server SV, the audio client CL recognizes two bytes (a portion corresponding to the property ID of the new format) from the starting of the reserve area of the old format shown in Table 1, so that the audio client CL recognizes "0x0000" (the reserve area is set to "0x0000"), and this makes possible to set the push port to the default port number "60001". Therefore, this application program has an upward compatibility. In addition, granted that the property ID is not set, "0x0000" of the reserve area of the old format (a portion corresponding to the port number of the new format) is erroneously determined to be a port number; however, when the property ID (or the reserve area corresponding to the property ID) is determined to be "0x0000", by setting the default port number, it is possible to prevent the value of the reserve area of the old format from being set to the port number erroneously.

According to the above-described embodiment, two port numbers are set in the content server SV; however, three or more port numbers may be set. Also in the case of setting three or more port numbers, only one of them is also set in the audio client CL and, by using the first port number, the remaining plural port numbers may be notified from the content server SV to the audio client CL.

Second Embodiment

According to the first embodiment, only one port number for searching is set. However, the port number for searching is sometime changed in accordance with the specification change of the present system. In this case, when the port number for searching is only changed at the content server SV side and the port number for searching is not changed at the audio client CL side, the audio client CL will fail to search the content server SV. Accordingly, it is needed to change the port number for searching also at the audio client CL side; however, such changing operation is not preferable because it is troublesome for the user.

Figure 5:
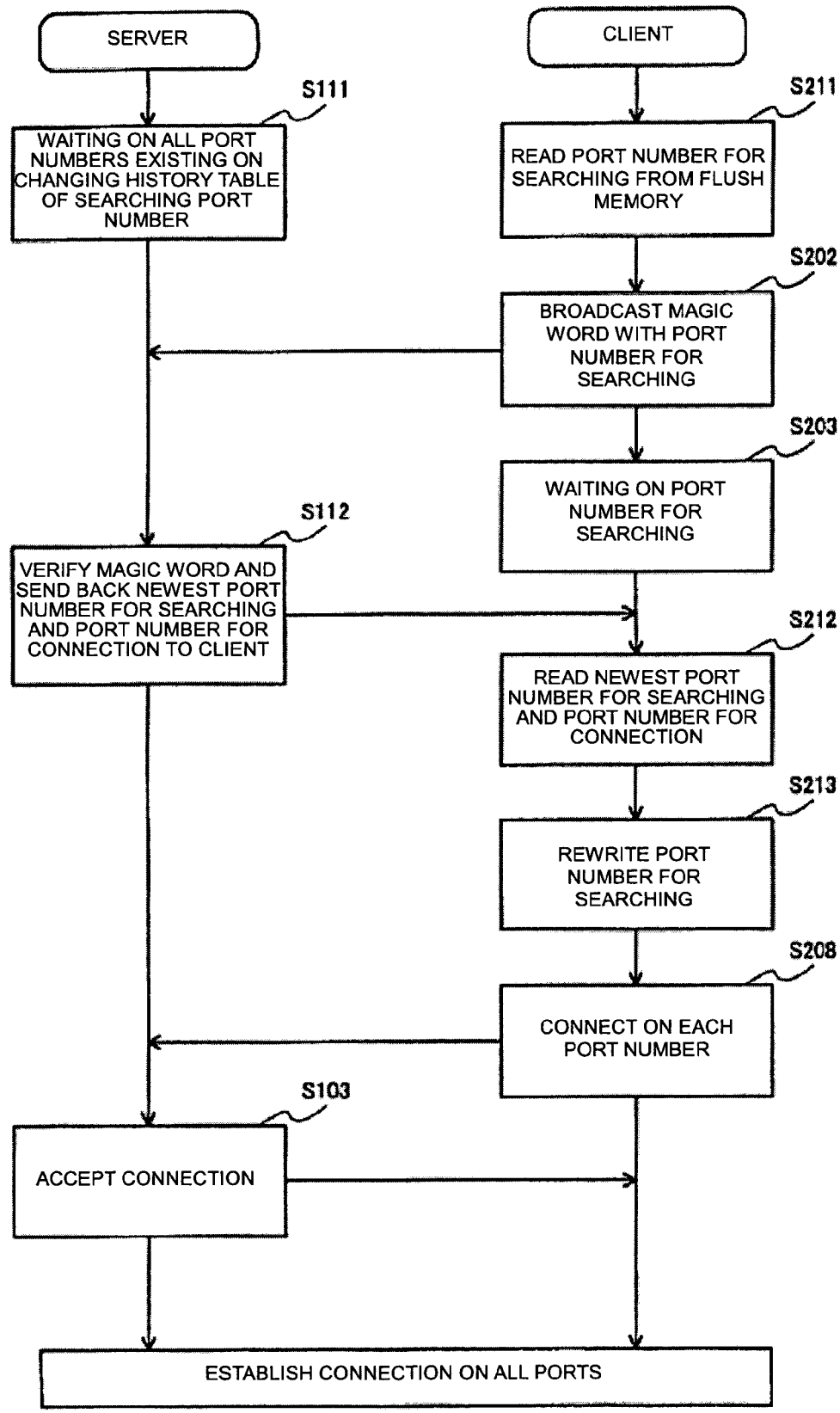
FIG. 5 is a flowchart showing the operation of a network audio system according to a second embodiment of the present invention.

In order to solve such a problem, according to the second embodiment, a plurality of port numbers are set at the content server SV side in advance so that the audio client CL will automatically update the port number for searching. This detail will be described with reference to the flowchart shown in FIG. 5 below.

With reference to a changing history table of searching port number, the content server SV waits for the searching from the audio client on the all plural port numbers for searching existing in the table (S111). In the changing history table of searching port number, as shown in Table 3, a plurality of port numbers for searching and the number of them are included. These are not limited particularly; however, according to the present embodiment, it is assumed that five port numbers for searching "45000", "50000", "44450", "44490" and "45080" are used. In addition, assumed that the network audio system 10 used the port numbers for searching "45000", "50000", "44450" and "44490" in the past and the newest port number for searching "45080" is used at the present.

TABLE 3

Changing history table of searching port number

Number of port number (=5)
Port number 0 (=45000)
Port number 1 (=50000)
Port number 2 (=44450)
Port number 3 (=44490)
Port number 4 (=45080)

On the other hand, the audio client CL reads out the port number for searching that has been stored in a flush memory 30 (S211). Subsequently, the audio client CL creates a searching packet including a magic word and broadcasts the searching packet by using the above-mentioned read port number for searching (S202). For example, supposing that a third old port number for searching "44450" among the above-mentioned five port numbers for searching is stored in the flush memory 30, the audio client CL broadcasts the magic word by using the port number for searching "44450". After that, the audio client CL waits for the response from the content server SV on the port number for searching "44450" (S203).

Since the content server SV is waiting for the five port numbers including the port number "44450" as described above, it receives the searching packet broadcasted from the audio client CL on the port number "44450". The content server SV verifies the magic word included in the received searching packet, then, when the magic word is correct, the content server creates the searching response packet including the newest port number for searching and the port numbers for connection and sends back the searching response packet to the audio client CL by using the same port number "44450" (S112). According to the present embodiment, the newest port number for searching is "45080", so that the content server SV transmits the newest port number for searching "45080", the port numbers for connection "45080", "45081" and "45082" to the audio client CL. These port numbers for connection are set in the content server SV in advance. According to the present embodiment, the same port number "45080" is transmitted for searching and for connection; however, the different port numbers may be transmitted.

Subsequently, the audio client CL receives the searching response packet that is returned from the content server SV by using the port number for searching "44450" and reads the newest port number for searching and the port numbers for connection from the searching response packet (S212).

Then, the audio client CL compares the read newest port number for searching with the port number for searching that has been stored in the flush memory 30 and, when these are the different port numbers, the audio client CL rewrites the latter port number for searching into the newest one (S213). In other words, on the port number for searching that is read from the searching response packet, the flush memory 30 is overwritten. According to the present embodiment, the port number for searching that has been stored in the flush memory 30 is updated from "44450" into "45080". Accordingly, when the audio client CL searches for the content server SV in the next time, by using the newest port number for searching "45080", the audio client CL broadcasts the magic word.

Hereinafter, as same as the first embodiment, the content server SV and the audio client CL establish the connection on each of port numbers for connection (S208, S103).

As described above, according to the second embodiment, since the content server SV waits for the communication on a plurality of port numbers for searching including the port number for searching being used at the present and the port number for searching used in the past, even the audio client CL only knowing the old port number for searching is capable of searching the content server SV. In addition, since the content server SV notifies the newest port number for searching to the audio client CL to update the port number for searching that is set in the audio client CL, audio client CL can use the newest port number for searching when the audio client CL searches the content server SV again.

Third Embodiment

According to the first embodiment, the port number after the first one is capable of being set arbitrarily only at the content server SV side; however, the same first port numbers must be set at the both of the content server SV side and the audio client CL side. Accordingly, when the other application programs installed in the content server SV use the first port number in advance, the port number must be changed at the both of the content server SV side and the audio client CL side.

In addition, according to the second embodiment, even the audio client CL only knowing the old port number for searching is capable of searching the content server SV; however, when other application programs installed in the content server SV use the old port number for searching in advance, the audio client CL cannot search for the content server SV. Accordingly, also in this case, the port number for searching must be changed at the both of the content server SV side and the audio client CL side.

Figure 6:
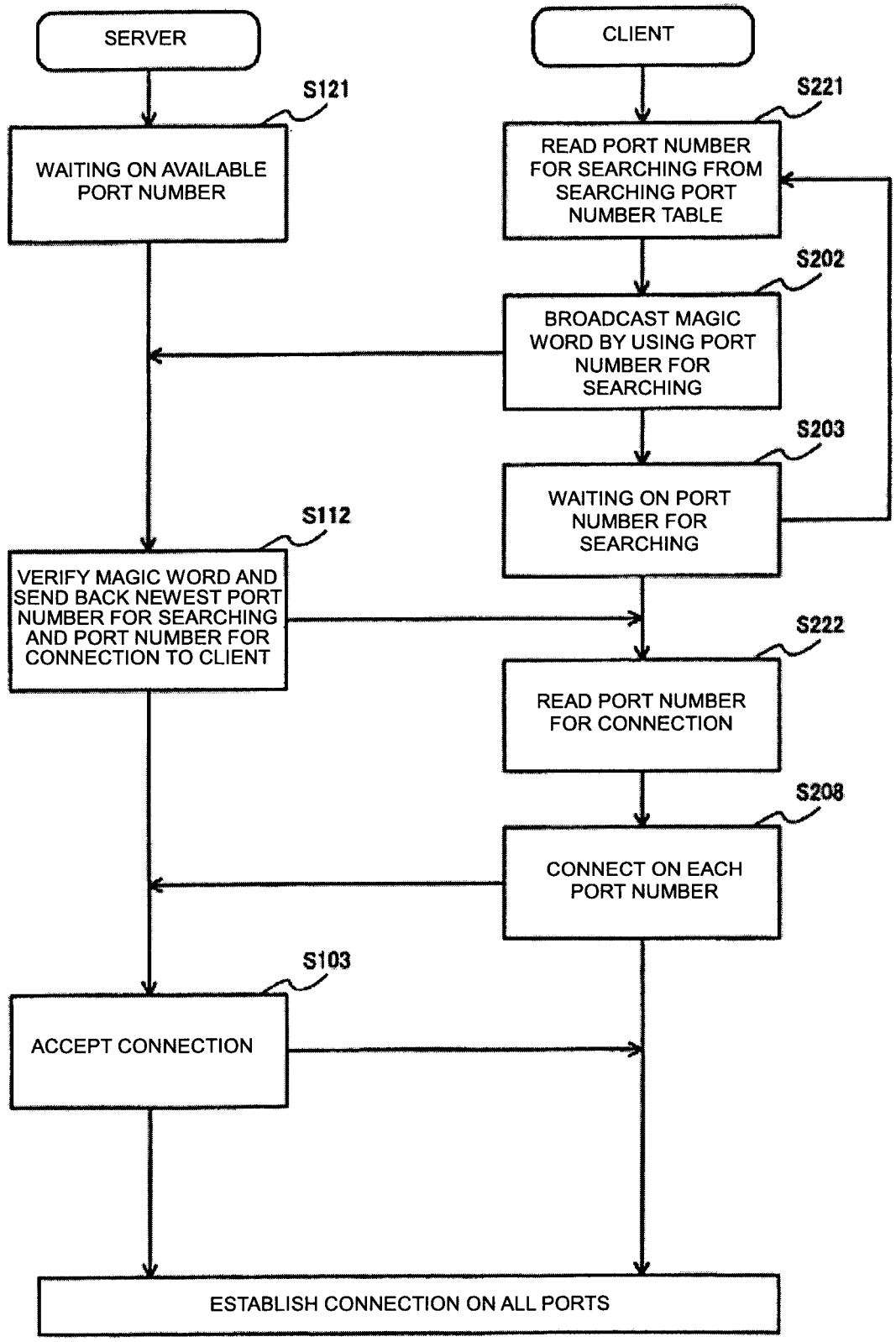
FIG. 6 is a flowchart showing the operation of a network audio system according to a third embodiment of the present invention.

In order to solve such a problem, according to a third embodiment, the audio client CL changes the port number for searching port sequentially and automatically. With reference to the flowchart shown in FIG. 6, this detail will be described below.

With reference to a searching port number table, the content server SV waits for the searching from the audio client CL on one port number for searching capable of being used among a plurality of port numbers for searching existing in the table (S121). As shown in Table 4, the searching port number table includes a plurality of port numbers for searching and the number of them. These are not limited particularly; however, according to the present embodiment, it is assumed that three port numbers for searching, namely, "45080", "46000" and "46080" are used. The searching port number table exists not only at the content server SV side but also at the audio client CL side.

TABLE 4

Table of searching port number

Number of port number (=3)
Port number 0 (=45080)
Port number 1 (=46000)
Port number 2 (=46080)

Figure 7:
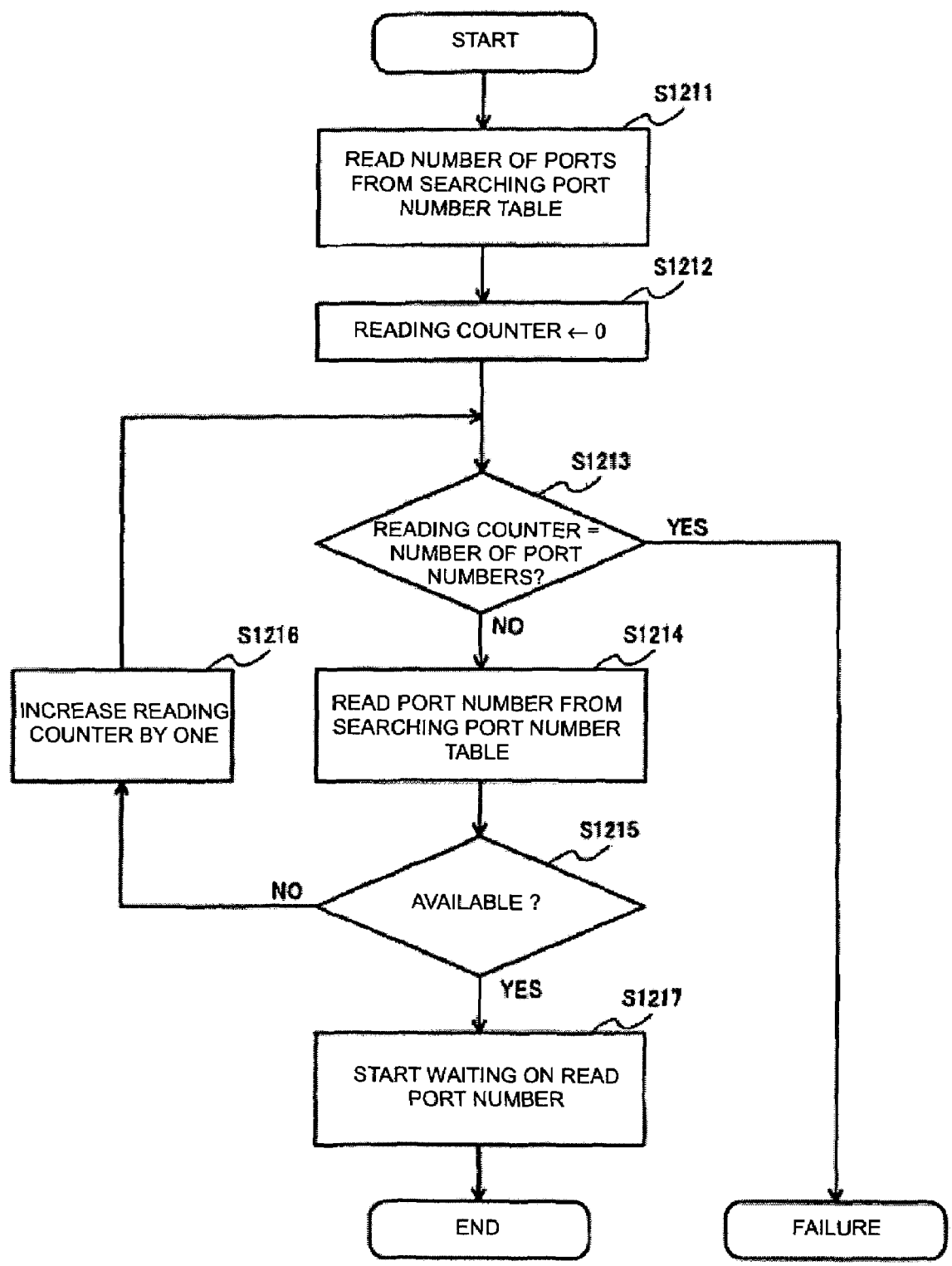
FIG. 7 is a flowchart showing the detail of a searching waiting processing by the content server shown in FIG. 6.

With reference to the flowchart shown in FIG. 7, the detail of this processing (S121) will be described below.

The content server SV reads the number of the port numbers from the searching port number table (S1211). According to the example shown in Table 4, the content server SV reads the number of the port number "3".

Subsequently, the content server SV resets a reading counter to "0" (S1212). The reading counter indicates the port number for searching to be read from the searching port number table.

Next, the content server SV compares the value of the reading counter with the above read number of the port numbers (S1213). If the value of the reading counter is equal to the number of the port numbers, supposing that the port number capable of being used does not exist, this processing will fail, otherwise, the procedure proceeds to step S1214.

The content serer SV reads the port number indicated by the reading counter from the searching port number table (S1214).

Subsequently, the content server SV determines whether or not the read port number is capable of being used on (S1215). If the read port number has been already used by the other application program, the port number is disabled, otherwise, it is enabled.

In the case that the port number is disabled, the content server SV increases a value of the reading counter by one (S1216) and the procedure returns to step S1213. On the other hand, in the case that the port number is enabled, the content server SV starts waiting by using the read port number (S1217). Thus, this processing will be finished.

For example, when the first port number "45080" among the three port numbers shown in Table 4 has been already used by the other application program, the content server SV determines the first read port number "45080" as disabled and the next read port number "46000" as enabled and, then, the content server SV starts waiting by using the port number "46000".

With reference to FIG. 6 again, the audio client CL sequentially reads the port numbers for searching from the searching port number table shown in Table 4 (S221), broadcasts the magic word on the read port number for searching (S202), and waits for the response from the content server SV on the port number for searching (S203).

Figure 8:
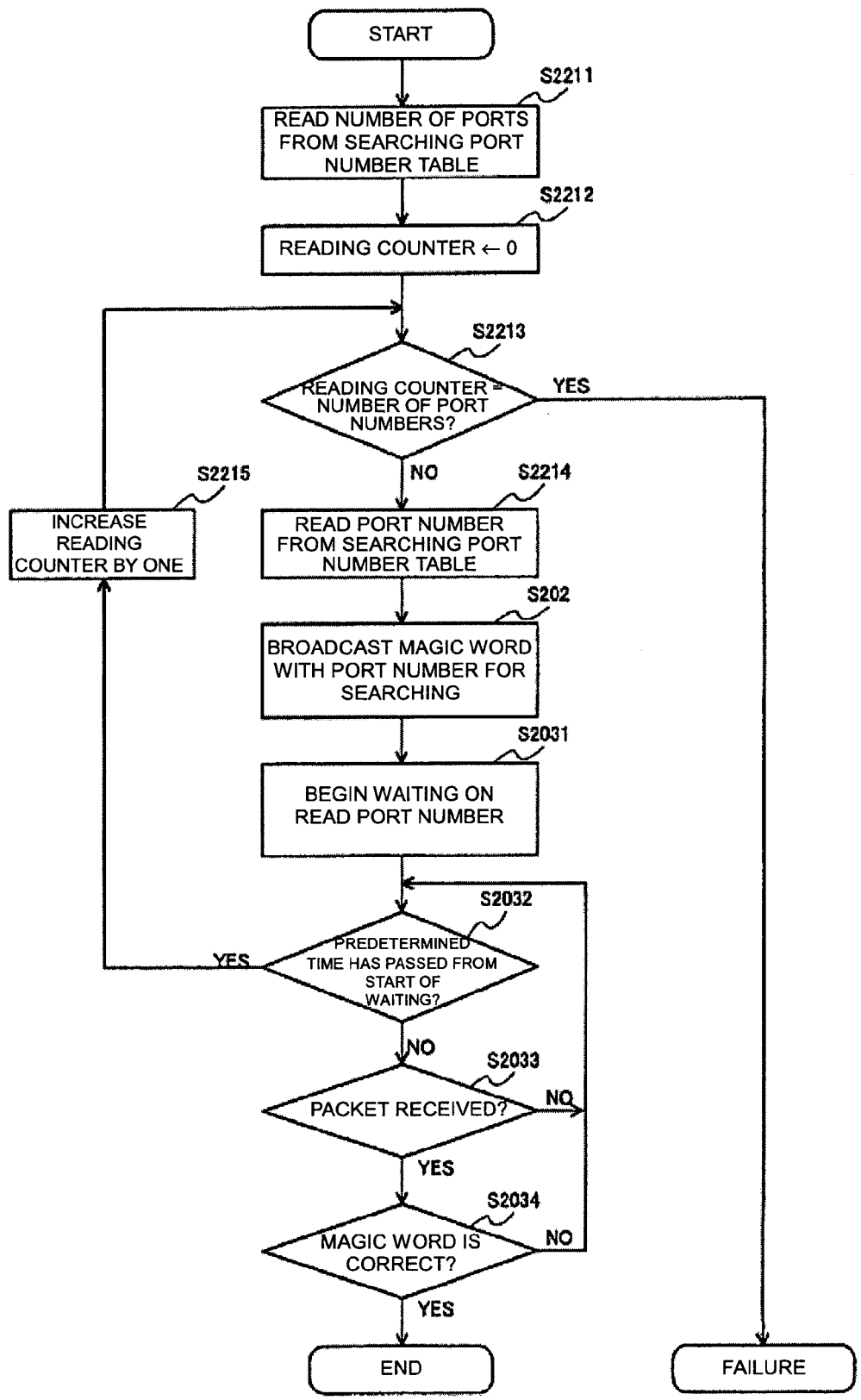
FIG. 8 is a flowchart showing the detail of a searching processing by the audio client shown in FIG. 6.

Hereinafter, the detail of this processing (S221, S202, S203) will be described with reference to the flowchart shown in FIG. 8.

The audio client CL reads the number of the port numbers from the searching port number table (S2211). According to the example shown in Table 4, the audio client CL reads the number "3" of the port number.

Subsequently, the audio client CL resets the value of the reading counter to "0" (S2212).

Next, the audio client CL compares the value of the reading counter with the number of the above read port numbers (S2213). If the value of the reading counter is equal to the number of the read port numbers, the procedure is failed because of no port number on which the audio client CL receives a response from the content server SV, otherwise, the procedure proceeds to next step S2214.

The audio client CL reads the port number indicated by the reading counter from the searching port number table (S2214).

Subsequently, the audio client CL creates a searching packet including the magic word, and broadcasts the searching packet by using the read port number for searching (S202).

Next, the audio client CL starts waiting on the port number for searching (S2031).

Subsequently, the audio client CL determines whether or not a predetermined time has been elapsed from the starting of waiting (S2032). In the case that the predetermined time has been elapsed without the response from the content server SV, the audio client CL increases the reading counter by one in order to change the port number for searching (S2215), and the procedure returns to step S2213. On the other hand, receiving the searching response packet from the content server SV within the predetermined time (S2033), the audio client CL determines whether or not the magic word included in the searching response packet is correct (S2034). When the magic word is correct, this processing is finished.

For example, as described above, when the content server SV is waiting for the searching from the audio client CL on the port number "46000", even when the magic word is broadcasted on the port number "45080" that has been read first by the audio client CL, there is no response from the content server SV; however, when the magic word is broadcasted on the port number "46000" that has been read next by the audio client CL, there is a response from the content server SV.

With reference to FIG. 6 again, the content server SV receives the searching packet from the audio client CL, verifies the magic word included in the received searching packet, and then, when the magic word is correct, the content server SV sends back the searching response packet including a port number for connection to the audio client CL (S112). The audio client CL reads the port number for connection from the received searching response packet (S222).

Hereinafter, similarly to the first embodiment, the content server SV and the audio client CL establish the connection on each port number for connection (S208, S103).

As described above, according to the third embodiment, the content server SV selects the available port number among the predetermined plural port numbers and waits for the searching from the audio client CL on the selected port number and, at the same time, the audio client CL searches for the content server SV by changing the predetermined plural port numbers by rotation, so that, even if some of the predetermined plural port numbers has been already used by the other application programs, the audio client CL is capable of searching for the content server SV.

FOURTH EMBODIMENT

Figure 9:
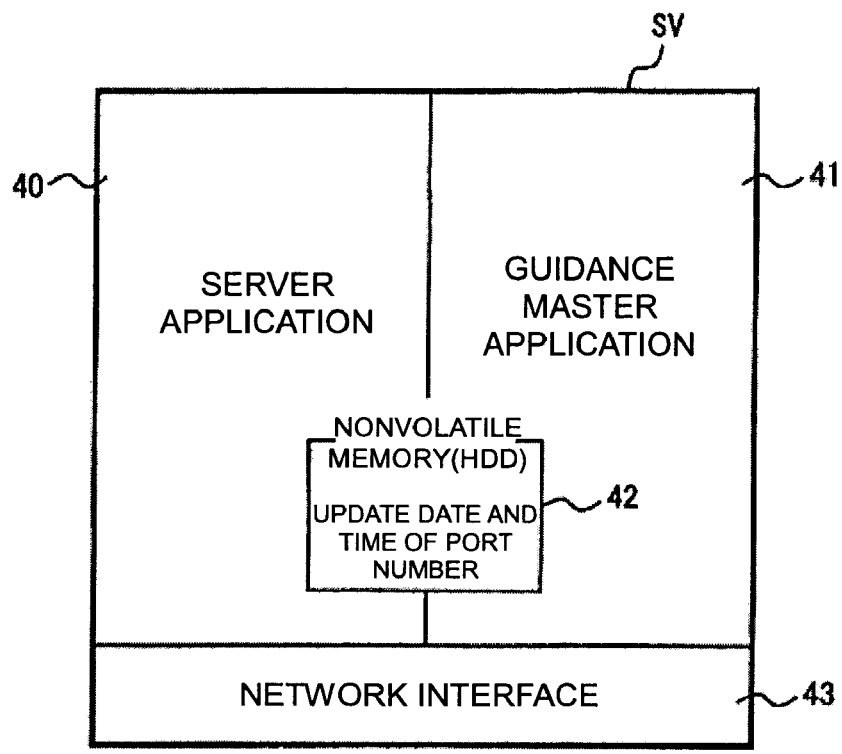
FIG. 9 is a functional block diagram showing an application structure of a content server according to a fourth embodiment of the present invention.

According to a fourth embodiment, as shown in FIG. 9, a guidance master application program (hereinafter, simply referred to as "guidance master application") 41 is installed in the content server SV in addition to a server application program (hereinafter, simply referred to as "server application") 40. The server application 40 is a computer program for providing a basic service such as distribution of the contents in response to the request from the audio client CL. The guidance master application 41 is a computer program for managing the port number to be used for the communication on the present network.

The content server SV includes a nonvolatile memory 42 such as an HDD. In the nonvolatile memory 42, a port number and its update date and hour are recorded. The guidance master application 41 sets the port number to be used for the communication on the present network in the nonvolatile memory 42, and further sets in the nonvolatile memory 42 the date and hour when the port number is set. The server application 40 communicates by using the port number set in the nonvolatile memory 42. The server application 40 and the guidance master application 41 share the same network interface 43.

Figure 10:
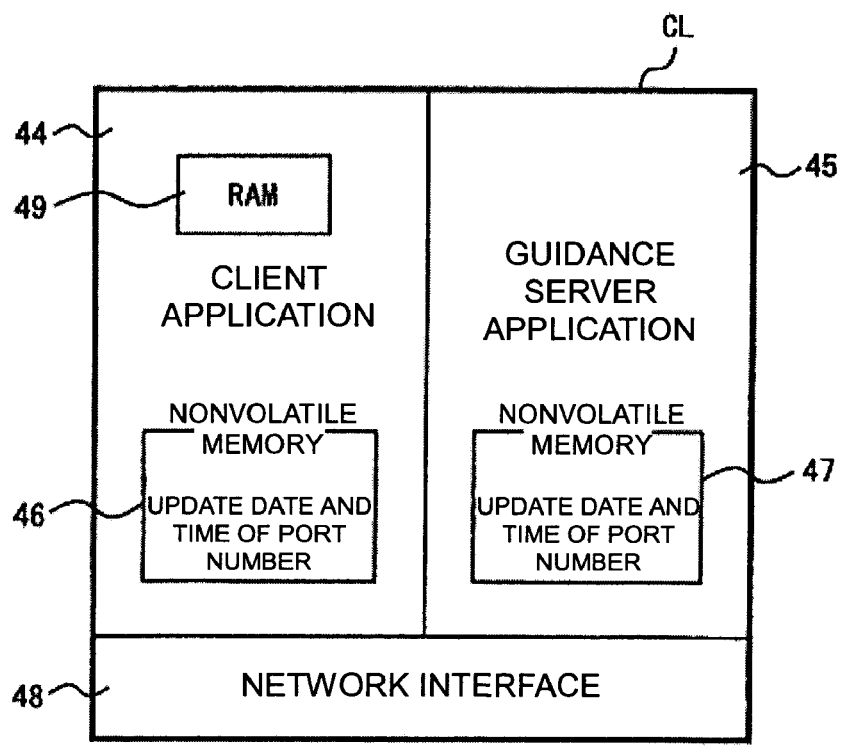
FIG. 10 is a functional block diagram showing an application structure of an audio client according to the fourth embodiment of the present invention.

On the other hand, as shown in FIG. 10, in the audio client CL, a guidance server application program (hereinafter, simply referred to as "guidance server application") 45, in addition to a client application program (hereinafter, simply referred to as "client application") 44, may be installed. The client application 44 is a computer program for providing a basic service such as requesting the contents for the content server SV and reproduction of the contents that are distributed in response to the request. The guidance server application 45 is also a computer program for managing the port number to be used for the communication on the present network.

The audio client CL includes nonvolatile memories 46 and 47 such as flush memories or the like and a RAM 49. In each of the nonvolatile memories 46 and 47, the port number and its update date and time are recorded. The guidance server application 45 sets the port number and its update date and time that are transmitted from the guidance master application 41 in the nonvolatile memory 47. The client application 44 sets the port number and its update date and time that are transmitted from the guidance server application 45 in the nonvolatile memory 46, and communicates by using the set port number. The client application 44 and the guidance server application 45 share the same network interface 48.

Figure 11:
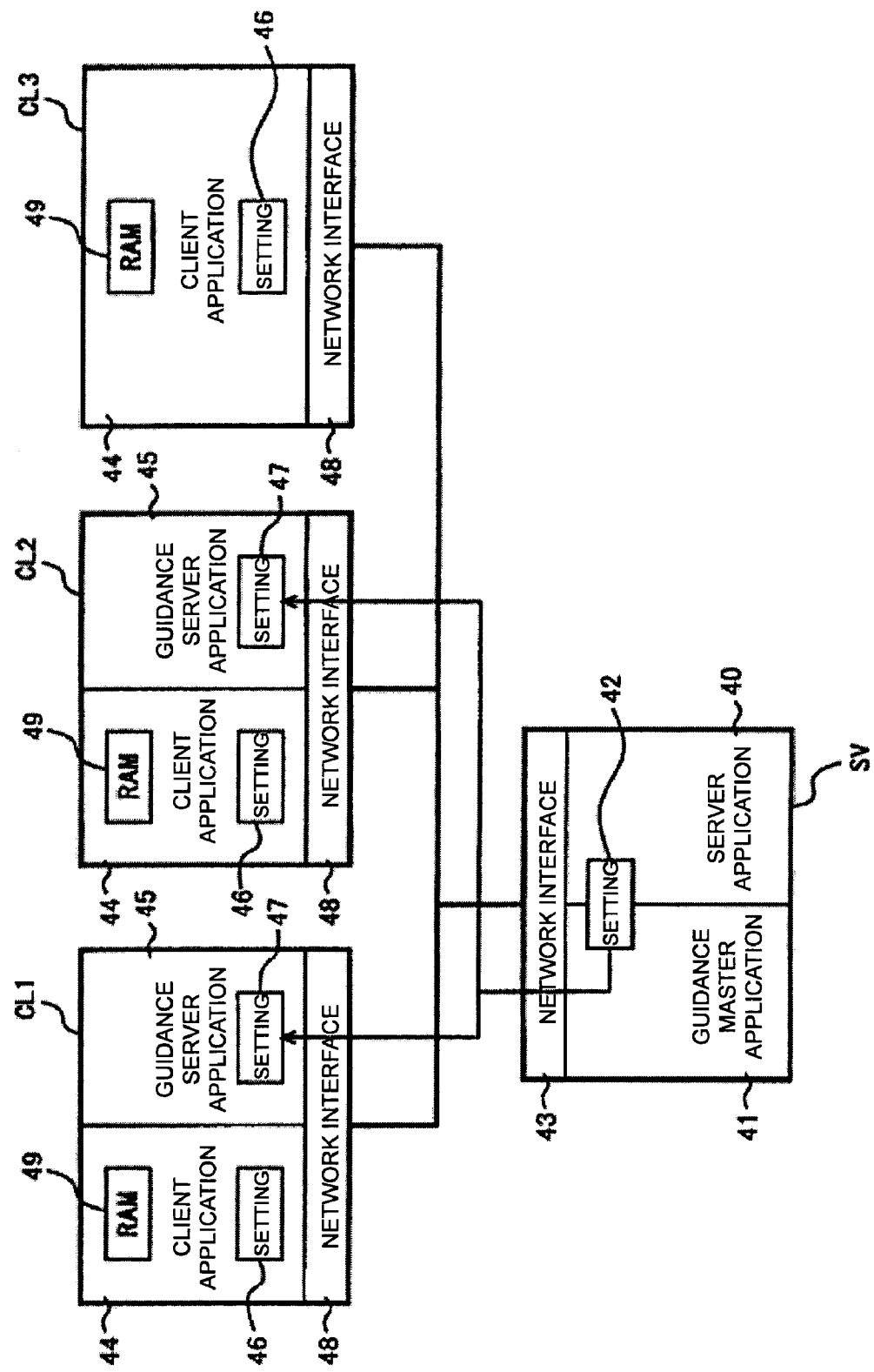
FIG. 11 is a functional block diagram showing the upload operation for a port number or the like according to the fourth embodiment of the present invention.
Figure 12:
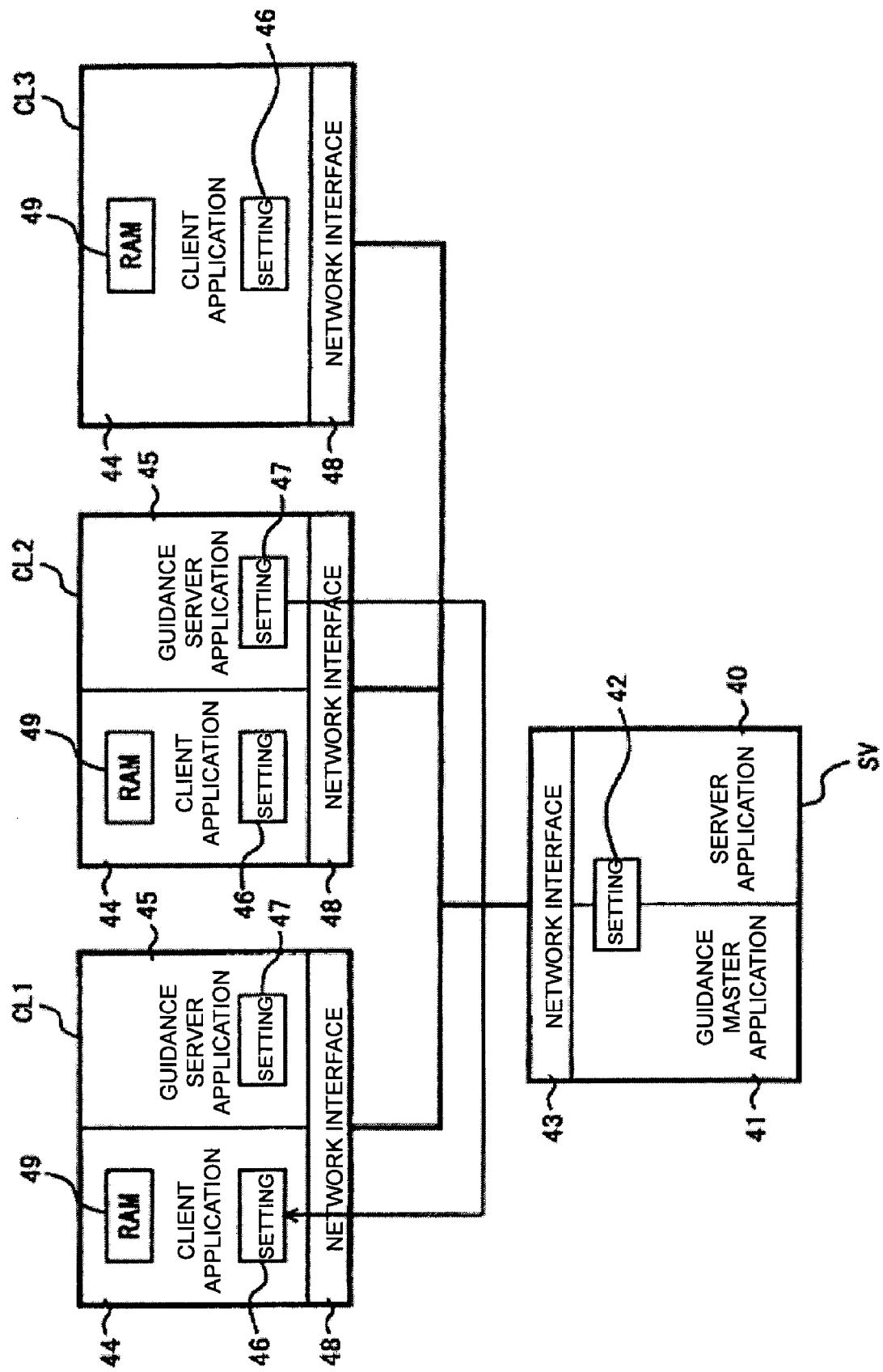
FIG. 12 is a functional block diagram showing the download operation for a port number or the like according to the fourth embodiment of the present invention.

There is only one guidance master application 41 on the present network. At least one guidance server application 45 is enough; however, two or more guidance server applications 45 can exist. According to the present embodiment, as shown in FIGS. 11 and 12, the guidance master application 41 is installed in only one content server SV. On the other hand, the guidance server application 45 is installed in the audio clients CL1 and CL2; however, it is not installed in an audio client CL3.

The guidance master application 41 inquires the guidance server application 45 about the port number, and then, when the update date and time that are set in the nonvolatile memory 47 of where to inquire is older than the update date and time set in the nonvolatile memory 42 of itself, as shown in FIG. 11, the port number set in the nonvolatile memory 47 of where to inquire is rewritten by the port number set in the nonvolatile memory 42 of itself. In other words, in the nonvolatile memory 42 for the guidance master application 41, the original port number and the original update date and time are saved, on the contrary, in the nonvolatile memory 47 for the guidance server application 45, their copies are saved. Thus, the guidance master application 41 is installed in the content server SV; however, it operates with respect to the guidance master application 45 like a client. After all, due to this operation, the newest port number is uploaded from the guidance master application 41 into the guidance server application 45.

In addition, the client application 44 inquires the guidance server application 45 about the port number, and then, when the update date and time that are set in the nonvolatile memory 47 of where to inquire is newer than the update date and time set in the nonvolatile memory 46 of itself, as shown in FIG. 12, the port number set in the nonvolatile memory 46 of itself is rewritten by the port number set in the nonvolatile memory 47 of where to inquire. In other words, in the nonvolatile memory 47 for the guidance server application 45, the copies of the port number and its update date and time are saved, on the contrary, in the nonvolatile memory 46 for the client application 44, their further copies are saved. Thus, the guidance server application 45 is installed in the audio clients CL1 and CL2; however, it operates with respect to the guidance master application 41 like a server. After all, due to this operation, the newest port number is downloaded from the guidance server application 45 into the client application 44.

Figure 13:
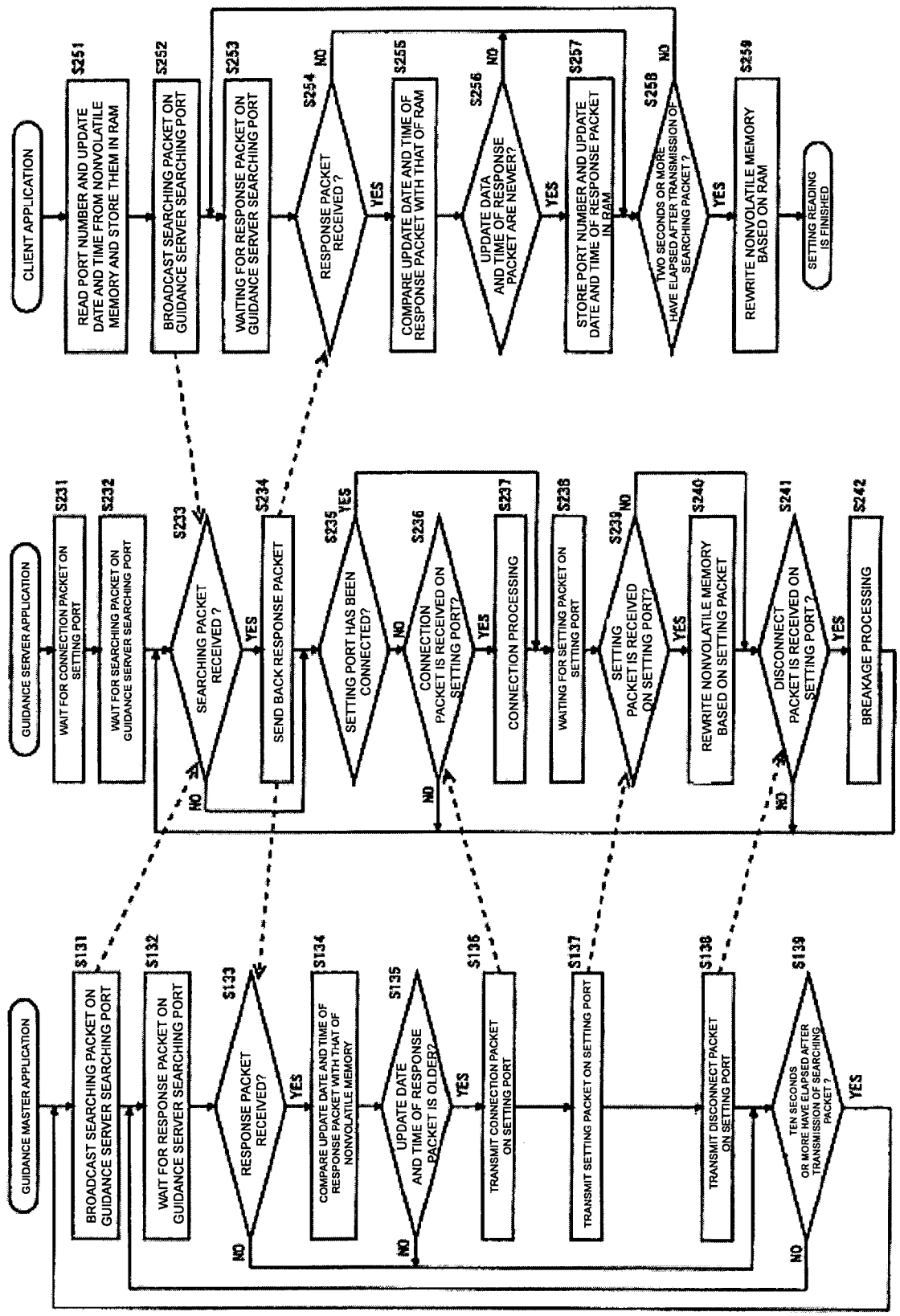
FIG. 13 is a flowchart showing the upload operation and the download operation shown in FIGS. 11 and 12.

Next, with reference to the flowchart shown in FIG. 13, the operation of this network audio system will be described below.

Hereinafter, a port for setting a port number is referred to as "setting port". In addition, a port for searching the guidance server application 45 is referred to as "guidance server searching port".

According to the present embodiment, it is assumed that the port number "70192" and its update date and time "13:20, Apr. 10, 2003" are recorded in the nonvolatile memory 42 for the guidance master application 41, the port number "70099" and its update date and time "11:40, Mar. 31, 2003" are recorded in the nonvolatile memory 47 for the guidance server application 45, and the port number "70092" and its update date and time "08:20, Mar. 10, 2003" are recorded in the nonvolatile memory 46 for the client application 44.

(1) Uploading from the guidance master application 41 into the guidance server application 45 (FIG. 11)

The guidance server application 45 waits for a connection packet from the guidance master application 41 on the setting port (S231). Specifically, the predetermined "70000" is used as the port number of the setting port, and TCP is used as a communication protocol.

The guidance server application 45 also waits for a searching packet from the guidance master application 41 on the guidance server searching port (S232). Specifically, the predetermined "70000" is also used as the port number of the guidance server searching port, and UDP is used as a communication protocol.

Subsequently, the guidance master application 41 searches for the guidance server application 45 existing on the network (S131 to S133, S233, S234). More specific description is as follows.

The guidance master application 41 creates a searching packet in accordance with the UDP and broadcasts (simultaneous transmissive communication) it on the network (S131). The searching packet includes a predetermined magic word, a port number "70000" of where to transmit, an IP address of the content server SV (a transmission source), and a port number (for example, "1025") that has never been used in the content server SV. The guidance master application 41 waits for a response packet from the guidance server application 45 after broadcasting the searching packet (S132).

Receiving the searching packet from the guidance master application 41, the guidance server application 45 creates a response packet and sends back it to the guidance master application 41 that transmitted the searching packet (S234). The response packet includes an IP address of where to send back (the content server SV), a port number "1025" of where to send back, and the port number read from the nonvolatile memory 47, and the update date and time of the port number.

Receiving the response packet from the guidance server application 45 (S133), the guidance master application 41 compares the update date and time of the port number included in the response packet with the update date and time of the port number that has been read from the nonvolatile memory 42 (S134). When the update date and time of the port number included in the response packet is older than the update date and time of the port number that has been read from the nonvolatile memory 42, the procedure proceeds to step S136 and, when the update date and time of the port number included in the response packet is newer than the update date and time of the port number that has been read from the nonvolatile memory 42, the procedure proceeds to step S139 (S135).

According to the present embodiment, the update date and time "13:20, Apr. 10, 2003" is recorded in the nonvolatile memory 42 for the guidance master application 41, and the update date and time "11:40, Mar. 31, 2003" is recorded in the nonvolatile memory 47 for the guidance server application 45, so that the guidance master application 41 determines that the port number in the guidance server application 45 is older than that of the guidance master application 41 and the procedure proceeds to step S136 to start the update of the port number.

In order to update the port number, at first, the guidance master application 41 transmits the connection packet to the guidance server application 45 by using the setting port (S136). The connection packet includes an IP address of where to transmit (the audio client CL) and a port number "70000" of where to transmit.

In the case that the connection has not been established yet on the setting port (S235), receiving the connection packet from the guidance master application 41 (S236), the guidance server application 45 performs the connection processing with respect to the guidance master application 41 (S237). After establishing the connection by the setting port, the guidance server application 45 waits for the setting packet from the guidance master application 41 (S238).

The guidance master application 41 creates a setting packet and transmits it to the guidance server application 45 (S137). The setting packet includes an IP address of where to transmit (the audio client CL), a port number "70000" of where to transmit, a port number that has been read from the nonvolatile memory 42, and the update date and time of the port number.

When receiving the setting packet from the guidance master application 41 (S239), the guidance server application 45 rewrites the nonvolatile memory 47 with the port number and the update date and time included in the setting packet (S240). Hereby, the port number of the guidance server application 45 is updated.

Next, the guidance master application 41 transmits a disconnection packet to the guidance server application 45 (S138). When receiving the disconnection packet from the guidance master application 41 (S241), the guidance server application 45 executes the process of disconnection from the guidance master application 41 (S242).

When a predetermined period of time (for example, 10 seconds) or more has elapsed after the guidance master application 41 transmitted the searching packet, the procedure returns to step S131 to broadcast the searching packet again. In other words, the guidance master application 41 inquires the guidance server application 45 about the port number and its update date and time for each predetermined period of time.

The guidance master application 41 performs the above-described operation also upon starting up of the content server SV and updating of the setting to upload a new port number and its update date and time in the guidance server application 45.

In the case that a plurality of guidance server applications 45 are running on the network, the guidance master application 41 receives a plurality of response packets. In this case, the new port numbers are transmitted to all of the guidance server applications 45 managing the old port numbers from the guidance master application 41 so as to rewrite the old port numbers.

(2) Downloading from the guidance server applications 45 into the client application 44 (FIG. 12)

Steps S252 to S256 executed by the client application 44 are approximately same as steps S131 to S135 executed by the guidance master application 41. The response operation of the guidance server application 45 with respect to the client application 44 (S233, S234) are exactly same as the response operation of the guidance server application 45 with respect to the guidance master application 41 (S233, S234). Steps S235 to S242 executed by the guidance server application 45 do not operate with respect to the client application 44.

At first, the client application 44 reads the port number and its update date and time from the nonvolatile memory 46 to store it in a RAM 49 (S251).

The client application 44 broadcasts the searching packet on the guidance server searching port (S252) to wait for the response packet (S253).

When receiving the searching packet from the client application 44 (S233), the guidance server application 45 sends back the response packet to the client application 44 that has transmitted the searching packet (S234).

When receiving the response packet from the guidance server application 45 (S254), the client application 44 compares the update date and time of the port number included in the response packet to that of the port number that is read from the RAM 49 (S255). When the update date and time of the port number included in the response packet is newer than that of the port number that is read from the RAM 49, the procedure proceeds to step S257, and when the update date and time of the port number included in the response packet is older than that of the port number that is read from the RAM 49, the procedure proceeds to step S258 (S256).

According to the present embodiment, since the update date and time "08:20, Mar. 10, 2003" is recorded in the nonvolatile memory 46 for the client application 44, and the update date and time "11:40, Mar. 31, 2003" is recorded in the nonvolatile memory 47 for the guidance server application 45, the client application 44 determines that the port number of the guidance server application 45 is newer than that of the client application 44, and the procedure proceeds to step S257 to start the update of the port number.

In order to update the port number, at first, the client application 44 stores the port number and its update date and time included in the response packet in the RAM 49 (S257).

When two or more seconds have elapsed from the transmission of the searching packet (S258), the client application 44 rewrites the nonvolatile memory 46 with the port number and its update date and time included in the RAM 49 (S259). When two or more seconds have not elapsed yet from the transmission of the searching packet, the procedure returns to step S253, and the client application 44 waits for the response packet (S253).

The client application 44 performs the above-described operation upon starting up of the audio client CL and for each predetermined period of time (for example, 30 seconds) to download a new port number and its update date and time from the guidance server application 45.

When a plurality of guidance server applications 45 are running on the network, the client application 44 receives a plurality of response packets. When the update date and time of the port number in each response packet are newer than that of the port number in the RAM 49, the new port number and its update date and time included in the response packet are stored in the RAM 49. Accordingly, the newest port number and its update date and time among a plurality of guidance server applications 45 are finally stored in the RAM 49 and then, they are stored in the nonvolatile memory 46.

As described above, according to the fourth embodiment, since the guidance master application 41 uploads the port number into the guidance server application 45 and the uploaded port number is downloaded by the client application 44, only by setting the port number in the content server SV, the port number may be automatically set also in all audio clients CL. As a result, it is possible to decrease trouble of setting the port number.

In addition, since there is only one guidance master application 41 on the network, the same port number is set in all audio clients CL. Further, only by changing the port number of the guidance master application 41, the port numbers of the all audio clients CL are automatically changed. In addition, since the guidance master application 41 periodically uploads the port number in the guidance server application 45 and the client application 44 periodically downloads the uploaded port number, the newest port number is set in the all audio clients CL.

In addition, since the client application 44 searches for the guidance server application 45 upon starting up of the audio client CL to download the new port number, even when the audio client CL with the old port number still set is connected to the network, a new port number is set immediately.

Further, the guidance server application 45 is installed in the audio client CL, and by using the predetermined port number "70000", the guidance server application 45 waits for the connection packet and the searching packet. On the other hand, the guidance master application 41 is installed in the content server SV to transmit the connection packet and the searching packet on the unused port number. Since the audio client CL is a machine only for playing music, the other application programs are not installed therein. Therefore, competition of the port number such that the other application programs use the port number "70000" before the guidance server application 45 uses it or the other application programs use the port number "70000" while the guidance server application 45 uses it does not occur in the audio client CL. On the other hand, since the content server SV is a multi-purpose machine, the other application programs sometimes are installed. However, the guidance master application 41 never waits for the packet by using a predetermined port number. Therefore, also in the content server SV, the competition of the port number does not occur.

In addition, since the guidance server application 45 is installed in a plurality of audio clients CL, respectively, when at least one audio client CL among them is running, the port numbers are set in the all audio clients CL. Further, since the guidance master application 41 is installed in the content server SV that is always running, a new port number is constantly uploaded in the guidance server application 45.

Modification of Fourth Embodiment

Figure 14:
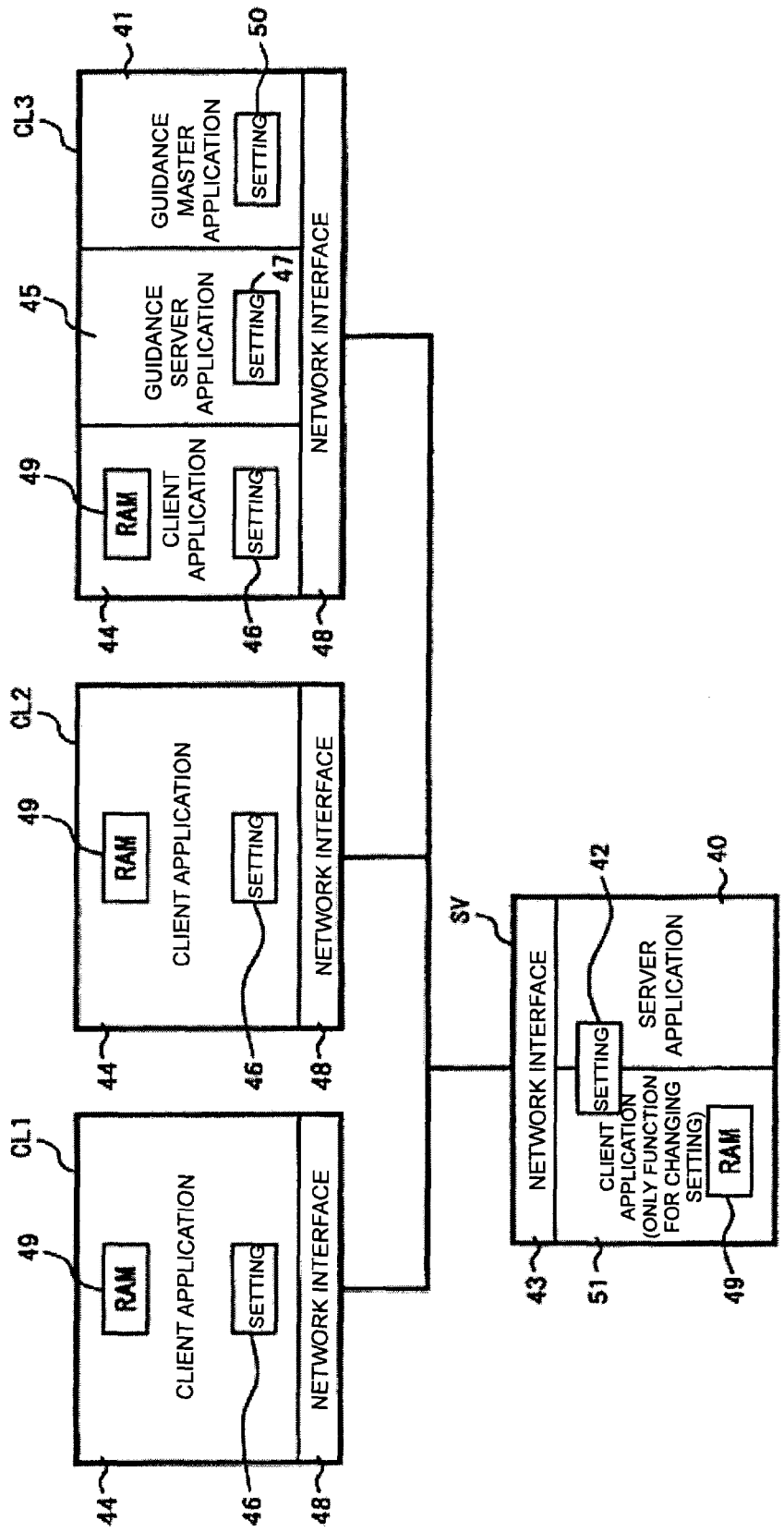
FIG. 14 is a functional block diagram showing a modification of the fourth embodiment shown in FIGS. 9 to 13.

According to the fourth embodiment, the guidance master application 41 is installed in the content server SV; however, as shown in FIG. 14, it may be installed in any one of the audio clients (according to the example shown in FIG. 14, CL3). In this case, an nonvolatile memory 50 is provided to save the port number and its update date and time for the guidance master application 41. In addition, a client application 51 only having the function of steps S251 to S259 is installed in the content server SV. The client application 51 downloads the port number and its update date and time from the guidance server application 45 to rewrite the nonvolatile memory 42. The server application 40 uses the port number that is downloaded into the nonvolatile memory 42.

In addition, when a plurality of content servers SV exists on the network, installing the guidance master application 41 in one content server SV, the client application 51 only having the function of steps S251 to S259 may be installed in the other content server SV, or installing the guidance master application 41 in one audio client CL, the client application 51 only having the function of steps S251 to S259 may be installed in the all content servers SV.

As described above, the guidance master application 41 is installed together with the server application 40 or the client application 44; however, a machine in which only the guidance master application 41 is installed may be located on the network.

In addition, in order to avoid the competition of the port number, as described above, it is preferable to install the guidance server application 45 in the audio client CL as an embedded machine; however, the guidance server application 45 may be installed in the content server SV Thus, the guidance master application 41 and the guidance server application 45 may be installed in any machine on the network, so that a flexible network construction is possible.

Further, in the case of using a general purpose PC for the content server SV, in addition to the server application 40 and the guidance master application 41, an application program for changing the setting of the port number (hereinafter, referred to as "application for changing the setting") may be installed. The application for changing the setting may change the port number by using GUI (Graphical User Interface) or may download the port number by accessing an outer server via Internet. Upon changing the port number, its date and time are also set. Alternatively, the server application 40 or the guidance server application 45 may be provided with a function for the application for changing the setting.

In addition, in place of the port number or together with the port number, the information regarding the basic service (the distribution of the music and the reproduction thereof) to be provided by the present network audio system may be set. The setting information includes a setting matter regarding the network protocol (for example, the magic word included in the searching packet) and a computer program itself such as a firmware operating on the audio client CL and JAVA (TM) or the like. It is noted that, since transmission of a large amount of setting information by UDP as a program as a limit, in this case, the setting information itself is not included in the response packet from the guidance server application 45 but a setting item name and an update date and time are included therein. The client application 44 that has received the response packet establishes the connection with respect to the guidance server application 45 by TCP only in the case of determines that the update is needed, and then, the client application 44 obtains the all of the necessary setting information to update the setting information of itself. Hereinafter, an example of the response packet will be cited in the case of as the setting information, managing the firmware and managing the port number below.

In the case of managing the firmware, the response packet by the UDP includes, for example, a class of the firmware and its update date and time as below but it does not include the firmware itself. The firmware is transmitted by the TCP.

CLIENT_TYPE1_FIRMWEAR: 2002.12.22.15.30

CLIENT_TYPE2_FIRMWEAR: 2002.12.20.10.10

In the case of managing the port number, the response packet, for example, includes a class of the port number and its update date and time as below but it does not include the port number. The port number is transmitted by the TCP.

SERVICE_TYPE1_PORTNO: 2002.08.01.20.11

SERVICE_TYPE2_PORTNO: 2002.08.01.20.11

Other Embodiments

According to the first to fourth embodiments, the content server SV stores the musical contents; however, in place of the musical contents or together with the musical contents, image contents may be stored therein. Therefore, the present invention can be applied not only to a network AV system for distributing the image contents and reproducing them but also to a general server client system.

The embodiments of the present invention are described as above; however, the embodiments are only examples for carrying out the present invention. Therefore, the present invention is not limited to the embodiments and the present invention can be executed by appropriately changing the embodiments within a scope not departing from its spirit.

What is claimed is:

1. A server client system comprising:
a communication network,
a server connected to said communication network, and
a client connected to said communication network,
said server including a packet responder transmitting a response packet to said client on a first port being set to a first port number, the response packet including a second port number and identification information having a first value or a second value, and
said client including,
a receiver receiving the response packet from said server and reading the identification information from the received response packet,
a determiner determining whether the identification information read by said receiver has the first value or the second value, and
an automatic port setter setting a second port to the second port number when the identification information has the first value and setting the second port to a predetermined third port number when the identification information has the second value based on a result of determination by said determiner.

2. The server client system according to claim 1, wherein said client further includes a connection requester transmits a request for connection to said server on the second port set by said automatic port setter, and
said server further includes a connection responder responds the request for connection from said client to establish a connection between said server and said client of the second port.

3. The server client system according to claim 1, wherein said server further includes a first manual port setter setting the first port to the first port number and writing the second port number in the response packet in response to a user operation, and
said client further includes a second manual port setter setting the first port to the first port number in response to a user operation.

4. The server client system according to claim 1, wherein said client further includes a searcher broadcasting a searching packet to said communication network on the first port, and said packet responder transmits the response packet in response to the searching packet broadcasted by said searcher.

5. The server client system according to claim 4, wherein the searching packet includes a magic word which has been set in said client, and said packet responder transmits the response packet when the magic word included in the searching packet corresponds to a magic word which has been set in said server.

6. A server client system comprising:
a communication network,
a server connected to said communication network, and
a client connected to said communication network,
said client including,
a port number storage storing a searching port number,
a reader reading the searching port number from said port number storage, and
a searcher setting a searching port to the searching port number read by said reader and broadcasting a searching packet to said communication network on the set searching port,
said server including,
a waiter waiting for the searching packet from said client on the searching port set to a newest searching port number being used at the present and one or more old searching port numbers used in the past, and
a packet responder transmitting a response packet to said client on the searching port in response to the searching packet broadcasted by said searcher, the response packet including the newest searching port number, and
said client further including,
a receiver receiving the response packet from said server and reading the newest searching port number from the received response packet, and
a rewriter rewriting the searching port number stored in said port number storage into the newest searching port number read by said receiver.

7. The server client system according to claim 6, wherein the response packet further includes a connecting port number,
said receiver further reads the connecting port number,
said client further includes a connection requester transmits a request for connection to said server on a connecting port set to the connecting port number read by said receiver, and
said server further includes a connection responder responds the request for connection from said client to establish a connection between said server and said client on the connecting port.

8. The server client system according to claim 6, wherein the searching packet includes a magic word which has been set in said client, and said packet responder transmits the response packet when the magic word included in the searching packet corresponds to a magic word which has been set in said server.

9. A server client system comprising:
a communication network,
a server connected to said communication network, and
a client connected to said communication network,
said server including,
a selector selecting a searching port number available among a plurality of searching port numbers, and
a waiter setting a searching port to the searching port number selected by said selector and waiting for a searching packet from said client on the set searching port,
said client including,
a selector selecting a searching port number to be used among said plurality of searching port numbers, and
a searcher setting the searching port to the searching port number selected by said selector and broadcasting the searching packet to said communication network on the set searching port,
said server further including a packet responder transmitting a response packet to said client on the search port in response to the searching packet broadcasted by said searcher; and
said client further including a changer changing the searching port number to be selected by said selector when receiving no response packet from said server.

10. The server client system according to claim 9, wherein
the response packet includes a connecting port number, and
said client further includes,
a receiver receiving the response packet from said server and reading the connecting port number from the received response packet, and
a connection requester transmits a request for connection to said server on a connecting port set to the connecting port number read by said receiver, and
said server further includes a connection responder responds the request for connection from said client to establish a connection between said server and said client on the connecting port.

11. The server client system according to claim 9, wherein
the searching packet includes a magic word which has been set in said client, and said packet responder transmits the response packet when the magic word included in the searching packet corresponds to a magic word which has been set in said server.

12. A client connected to a server through a communication network, said client comprising:
a receiver receiving a response packet transmitted from said server on a first port being set to a first port number, the response packet including a second port number and identification information having a first value or a second value and reading the identification information from the received response packet,
a determiner determining whether the identification information read by said receiver has the first value or the second value, and
an automatic port setter setting a second port to the second port number when the identification information has the first value and setting the second port to a predetermined third port number when the identification information has the second value based on a result of determination by said determiner.

* * * * *